(12) United States Patent
Kwon et al.

(10) Patent No.: US 10,556,797 B2
(45) Date of Patent: Feb. 11, 2020

(54) CATALYST FOR MANUFACTURING MULTI-WALLED CARBON NANOTUBE AND METHOD OF MANUFACTURING MULTI-WALLED CARBON NANOTUBE USING THE SAME

(71) Applicants: SK Innovation Co., Ltd., Seoul (KR); SK Global Chemical Co., Ltd., Seoul (KR)

(72) Inventors: Yong-Tak Kwon, Daejeon (KR); Ok-Youn Kim, Daejeon (KR)

(73) Assignees: SK Innovation Co., Ltd., Seoul (KR); SK Global Chemical Co., Ltd., Seoul (KR)

(*) Notice: Subject to any disclaimer, the term of this patent is extended or adjusted under 35 U.S.C. 154(b) by 282 days.

(21) Appl. No.: 15/652,547

(22) Filed: Jul. 18, 2017

(65) Prior Publication Data
US 2018/0016147 A1    Jan. 18, 2018

(30) Foreign Application Priority Data

Jul. 18, 2016 (KR) .................. 10-2016-0090515

(51) Int. Cl.
*C01B 32/162* (2017.01)
*B01J 23/75* (2006.01)
(Continued)

(52) U.S. Cl.
CPC .............. *C01B 32/162* (2017.08); *B01J 23/75* (2013.01); *B01J 37/0236* (2013.01);
(Continued)

(58) Field of Classification Search
CPC ... B01J 23/75; B01J 21/12; B01J 37/08; B01J 37/0236; B01J 37/035; B01J 2523/00; B01J 2523/31; B01J 2523/41; B01J 2523/842; B01J 2523/845; C01B 32/162; C01B 2202/22; C01B 2202/06
See application file for complete search history.

(56) References Cited

U.S. PATENT DOCUMENTS

2011/0085961 A1*  4/2011  Noda .................. B01J 37/0217
                                                                423/447.3
2016/0214863 A1   7/2016  Kim et al.

FOREIGN PATENT DOCUMENTS

KR    10 2015 0142408 A    12/2015

OTHER PUBLICATIONS

Kukovecz, et al., Catalytic synthesis of carbon nanotubes over Co, Fe and Ni containing conventional and sol-gel silica-aluminas, Phys. Chem. Chem. Phys. 2000; 2: 3071-3076 (Year: 2000).*

(Continued)

*Primary Examiner* — Daniel C. McCracken
(74) *Attorney, Agent, or Firm* — The Webb Law Firm (57) ABSTRACT

Disclosed are a catalyst for manufacturing multi-walled carbon nanotubes and a method of manufacturing multi-walled carbon nanotubes, which has aligned bundle structure with a small number of walls and low surface resistance and density. The catalyst for manufacturing multi-walled carbon nanotubes according to the present invention includes a silica-alumina ($SiO_2$—$Al_2O_3$) mixed carrier; and a transition metal main catalyst supported on the mixed carrier.

7 Claims, 5 Drawing Sheets

(51) Int. Cl.
*B01J 37/02* (2006.01)
*B01J 37/03* (2006.01)
*B01J 37/08* (2006.01)

(52) U.S. Cl.
CPC ............ *B01J 37/035* (2013.01); *B01J 37/08* (2013.01); *C01B 2202/06* (2013.01); *C01B 2202/22* (2013.01)

(56) References Cited

OTHER PUBLICATIONS

Chien-Te Hsieh et al., "Synthesis of carbon nanotubes over Ni- and Co-supported CaCO3 catalysts using catalytic chemical vapor deposition", Materials Chemistry and Physics, Apr. 2009, pp. 702-708, vol. 114;2-3.

* cited by examiner

CATALYST FOR MANUFACTURING MULTI-WALLED CARBON NANOTUBE AND METHOD OF MANUFACTURING MULTI-WALLED CARBON NANOTUBE USING THE SAME

CROSS-REFERENCE TO RELATED APPLICATION

This application claims priority to Korean Patent Application No. 10-2016-0090515 filed Jul. 18, 2016, the disclosure of which is hereby incorporated in its entirety by reference.

BACKGROUND OF THE INVENTION

Field of the Invention

The present invention relates to a catalyst for manufacturing multi-walled carbon nanotubes and a method of manufacturing multi-walled carbon nanotubes using the same, and more particularly, to a catalyst for manufacturing multi-walled carbon nanotubes which a transition metal main catalyst is supported on a silica-alumina ($SiO_2$—$Al_2O_3$) mixed carrier, thereby being capable of manufacturing multi-walled carbon nanotubes having an aligned bundle structure with small number of walls, low surface resistance and low density, and a method of manufacturing multi-walled carbon nanotubes using the same.

Description of Related Art

Carbon nanotubes have a rounded shape with nano-sized diameter of graphite surfaces having hexagonal honeycomb wherein one carbon atom is bonded to three different carbon atoms, and are macromolecules with unique physical properties depending on their size and shape.

Generally, carbon nanotubes exhibit a cylindrical shape in which a graphite surface curls up. Carbon nanotubes can be classified into single walled carbon nanotubes, double walled carbon nanotube and multi walled carbon nanotube, with one, two and three or more cylindrical shape graphite surface, respectively, and they have different characteristics depending on the number of the walls. For example, single-walled or double-walled carbon nanotubes have high electrical properties and are thus widely used in device applications such as electron-emitting devices, electronic devices and sensors, and multi-walled carbon nanotubes can be applied to high-intensity complex materials because of high physical properties although the electrical properties thereof are low compared to single or double walled nanotubes.

Recently, attempts have been made to utilize multi-walled carbon nanotubes as an additive for an electroconductive polymer such as an antistatic agent, however, it is urgent more than anything to improve high surface resistance of the conventional multi-walled carbon nanotubes.

Related arts are Korean Patent Publication No. 10-2015-0142408 (published on Dec. 22, 2015), which discloses supported catalysts, aggregates of carbon nanotubes obtained therefrom, and methods of producing the same.

SUMMARY OF THE INVENTION

An object of the present invention is to provide a catalyst for manufacturing multi-walled carbon nanotubes capable of improving electrical conductivity by having an aligned bundle structure with a small number of walls and a low density and surface resistance, and a method of manufacturing multi-walled carbon nanotubes using the same.

To accomplish the object of the present disclosure, an embodiment of the present disclosure provides a catalyst for manufacturing multi-walled carbon nanotubes comprising: a silica-alumina ($SiO_2$—$Al_2O_3$) mixed carrier; and a transition metal main catalyst supported on the mixed carrier.

To accomplish the object of the present disclosure, an embodiment of the present disclosure provides a method of manufacturing multi-walled carbon nanotubes comprising the steps of: (a) providing a catalyst for manufacturing multi-walled carbon nanotubes comprising a silica-alumina mixed carrier and a transition metal main catalyst supported on the mixed carrier; and (b) forming multi-walled carbon nanotubes by reacting the catalyst for manufacturing multi-walled carbon nanotubes with hydrocarbon gas and hydrogen gas at 600 to 900° C.

EXPLANATION OF SYMBOLS

S110: Step of providing catalyst for manufacturing multi-walled carbon nanotubes S120: Step of forming multi-walled carbon nanotube

DESCRIPTION OF THE INVENTION

The present disclosure may be understood more readily by reference to the following detailed description of embodiments and accompanying drawings. However, the present disclosure may be embodied in many different forms, and should not be construed as being limited to the embodiments set forth herein. These Examples are intended to make the disclosure of the invention complete and to inform the skilled in the art to which the present invention pertains of the scope of the invention. The invention is only defined by the scope of the claims. The same reference numerals refer to same elements throughout the specification.

Hereinafter, a catalyst for manufacturing multi-walled carbon nanotubes and a method of manufacturing multi-walled carbon nanotubes using the same, according to preferred embodiments of the present invention will be described in detail with reference to the accompanying drawings.

Catalyst for Manufacturing Multi-Walled Carbon Nanotubes

A catalyst for manufacturing multi-walled carbon nanotubes according to an embodiment of the present invention comprises a silica-alumina ($SiO_2$—$Al_2O_3$) mixed carrier and a transition metal main catalyst supported on the mixed carrier.

Specifically, the catalyst for manufacturing multi-walled carbon nanotubes according to an embodiment of the present invention preferably comprises 85 to 95% by weight of the silica-alumina mixed carrier and 5 to 15% by weight of the transition metal main catalyst.

The silica-alumina ($SiO_2$—$Al_2O_3$) mixed carrier may have a solid sphere structure. In this case, the solid sphere structure refers to a spherical shape having a filled interior space, which includes not only a complete spherical shape but also an elliptical shape or an unspecified shape of a granule.

The silica-alumina ($SiO_2$—$Al_2O_3$) mixed carrier is preferably added at a ratio of 85 to 95% by weight based on the total weight of the catalyst for manufacturing multi-walled carbon nanotubes. In particular, it is more preferable that the silica-alumina mixed carrier is composed of 5 to 20% by weight of silica and 80 to 95% by weight of alumina.

When the amount of silica ($SiO_2$) added is less than 5% by weight of the total weight of the silica-alumina mixed carrier, the amount of silica to be added is insufficient to change the acid property and morphology of alumina ($Al_2O_3$) so that the density and the surface resistance of the multi-walled carbon nanotubes may not be sufficiently reduced. On the contrary, when the amount of silica ($SiO_2$) added is more than 20% by weight of the total weight of the silica-alumina mixed carrier, the catalytic activity is drastically lowered due to excessive addition and the purity of the produced multi-walled carbon nanotubes is low, thereby undesirably causing a problem of deterioration of quality.

The transition metal main catalyst is prepared by impregnation, which is a conventional catalyst production method, and is uniformly dispersed both inside and outside of the silica-alumina mixed carrier. At this time, the transition metal main catalyst comprises at least one transition metal selected from the group consisting of iron (Fe), cobalt (Co), nickel (Ni), yttrium (Y), molybdenum (Mo), copper (Cu), platinum (Pt), palladium (Pd), vanadium (V), niobium (Nb), tungsten (W), chromium (Cr), iridium (Ir) and titanium (Ti). The transition metal main catalyst is uniformly adsorbed and dispersed on the surface and inside of the silica-alumina ($SiO_2$—$Al_2O_3$) mixed carrier.

As an aspect, the transition metal main catalyst may be prepared by impregnating a water-soluble transition metal main catalyst derivative to the inside and the outside of the silica-alumina mixed carrier (Incipient Wetness Impregnation). The water-soluble transition metal main catalyst derivative may be a metal hydrate and the metal hydrate may be at least one selected from iron (III) nitrate hydrate, nickel nitrate hydrate, cobalt nitrate hydrate and the like. The water-soluble metal catalyst derivative may be any derivatives which can be dissolved in a solvent such as water, methanol, ethanol, isopropanol, etc. in addition to metal nitrate hydrate.

The transition metal main catalyst is preferably added at a ratio of 1 to 15% by weight based on the total weight of the catalyst for producing multi-walled carbon nanotubes. When the addition amount of the transition metal main catalyst is less than 1 wt% of the total weight of the catalyst for preparing multi-walled carbon nanotubes, the catalyst is very short in life and has too low productivity to produce high purity multi-walled carbon nanotubes. On the contrary, when the amount of the transition metal main catalyst added exceeds 15 wt% of the total weight of the catalyst for preparing the multi-walled carbon nanotubes, it may be a factor that raises the manufacturing cost only without increasing the effect.

Method of Manufacturing Multi-Walled Carbon Nanotubes

Figure 1:
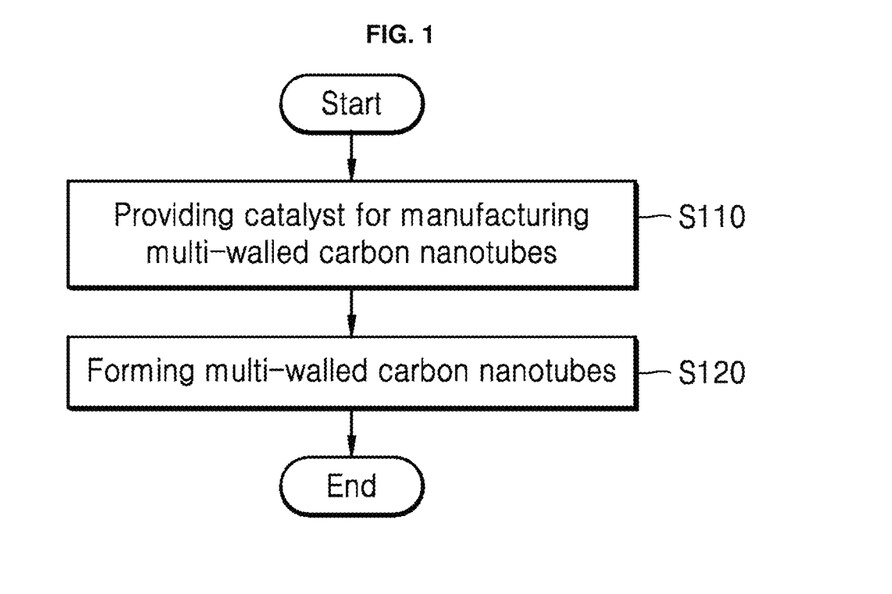
FIG. 1 is a flowchart illustrating a method of manufacturing a multi-walled carbon nanotube according to an embodiment of the present invention.

FIG. 1 is a flow chart illustrating a method of manufacturing a multi-walled carbon nanotube according to an embodiment of the present invention.

Referring to FIG. 1, a method of manufacturing a multi-walled carbon nanotube according to an embodiment of the present invention comprises a step for providing a catalyst for manufacturing multi-walled carbon nanotubes (S110) and a step for forming multi-walled carbon nanotubes (S120).

In the step S110, a catalyst for manufacturing multi-walled carbon nanotubes is provided.

The catalyst for manufacturing multi-walled carbon nanotubes can be synthesized by the impregnation method.

Specifically, a Si derivative and an Al derivative are dissolved in a solvent and mixed for 10 to 30 minutes. The mixture is dried at 100 to 150° C. for 1 to 3 hours and then heat-treated at 450 to 550° C. for 1 to 5 hours to manufacture a silica-alumina ($SiO_2$—$Al_2O_3$) mixed carrier.

Next, a transition metal main catalyst derivative is dissolved in a solvent and mixed with the silica-alumina ($SiO_2$—$Al_2O_3$) mixed carrier for 10 to 30 minutes. Thereafter, the catalyst is dried at 100 to 150° C. for 1 to 3 hours, and then heat-treated at 450 to 550° C. for 1 to 5 hours to form a catalyst for manufacturing multi-walled carbon nanotubes.

The above catalyst manufacturing method is simple in manufacturing process, and it is possible to uniformly support Si which controls the acid characteristics and morphology of the transition metal and the carrier, which are active materials.

In the step of forming the catalyst for manufacturing multi-walled carbon nanotubes (S120), the catalyst for manufacturing multi-walled carbon nanotube is reacted with hydrocarbon gas and hydrogen gas at 600 to 900° C. to form multi-walled carbon nanotubes.

At this time, the hydrocarbon gas may be methane, ethylene, acetylene, LPG, a mixed gas thereof and the like, but is not limited thereto, and may be introduced together with hydrogen gas. The hydrogen gas reduces and activates a metal oxide, which is the main catalytic material, and removes amorphous carbon-forming intermediate materials which can be generated when carbon nanotubes are manufactured.

The hydrocarbon gas and the hydrogen gas are preferably supplied at a flow rate of 50 to 500 sccm for 5 to 60 minutes, preferably 10 to 30 minutes, respectively.

The multi-walled carbon nanotubes manufactured by the above method have fewer walls and lower density and surface resistance than carbon nanotubes using a pure alumina carrier because a transition metal main catalyst is supported on a silica-alumina ($SiO_2$—$Al_2O_3$) mixed carrier.

In particular, the multi-walled carbon nanotubes manufactured by the method according to the embodiment of the present invention has an inversely proportional relationship in that number, density and surface resistance of walls is decreased according to increase in silica content of the silica-alumina mixed carrier.

As a result, the multi-walled carbon nanotubes manufactured by the method according to the embodiment of the present invention have a wall number of 5 to 10 and a density of 0.08 g/cc or less and a surface resistance of $2.0\times10^1$ to $6.0\times10^1$ $\Omega/\square$ due to having an aligned bundle structure.

Therefore, the multi-walled carbon nanotubes manufactured by the method according to the embodiment of the present invention has a low surface resistance and a high electric conductivity improving effect, and thus can be utilized as an additive for an electroconductive polymer such as an antistatic agent.

EXAMPLES

Hereinafter, the configuration and operation of the present invention will be described in more detail with reference to preferred embodiments of the present invention. It should be understood, however, that it is illustrated as a preferable example of the present invention which is not limited thereto.

The contents not described herein can be inferred sufficiently technically by the skilled in the art, and therefore a description thereof will be omitted.

Multi-walled Carbon Nanotube Manufacture

Table 1 shows the composition ratios of catalysts for multi-walled carbon nanotubes according to Examples 1 to 3 and Comparative Example 1.

TABLE 1

(Unit: % by weight)

| division | $SiO_2$—$Al_2O_3$ | $SiO_2$ $Al_2O_3$ | $Al_2O_3$ | Fe | Co |
|---|---|---|---|---|---|
| Example 1 | 90 | 5 / 85 | — | 7.5 | 2.5 |
| Example 2 | 90 | 10 / 80 | — | 7.5 | 2.5 |
| Example 3 | 90 | 20 / 70 | — | 7.5 | 2.5 |
| Comparative Example 1 | — | — | 90 | 7.5 | 2.5 |

Example 1

Siral 5 (Sasol, Silica-Boehmite) of 13 g was heat-treated at 500° C. for 3 hours to obtain 10 g of $SiO_2$—$Al_2O_3$ mixed carrier.

Next, 6.3 g of $Fe(NO_3)_3 \cdot 9H_2O$ and 1.45 g of $Co(NO_3)_2 \cdot 6H_2O$ were dissolved in 5 ml of water, 10 g of $SiO_2$—$Al_2O_3$ mixed carrier was added and mixed for 30 minutes. After mixing, the mixture was dried at 120° C. for 3 hours, and then heat-treated at 500° C. for 3 hours to prepare a catalyst for preparing multi-walled carbon nanotubes.

Next, 0.2 g of the catalyst for preparing multi-walled carbon nanotubes was placed in a fluidized bed synthesis apparatus, and 225 sccm of $C_2H_4$ (g) and 75 sccm of $H_2$ (g) were added and reacted at 700° C. for 20 minutes to prepare the multi-walled carbon nanotubes, respectively.

Example 2

A multi-walled carbon nanotube was prepared in the same manner as in Example 1 except that 13 g of Siral 10 (Sasol, Silica-Boehmite) was used.

Example 3

A multi-walled carbon nanotube was prepared in the same manner as in Example 1 except that 13 g of Siral 20 (Sasol, Silica-Boehmite) was used.

Comparative Example 1

Boehmite of 13 g was heat-treated at 500° C. for 3 hours to obtain 10 g of $Al_2O_3$ carrier.

Next, 6.3 g of $Fe(NO_3)_3 \cdot 9H_2O$ and 1.45 g of $Co(NO_3)_2 \cdot 6H_2O$ were dissolved in 5 ml of water, 10 g of $Al_2O_3$ carrier was added thereto, and the mixture was stirred for 30 minutes. After stirring, the mixture was dried at 120° C. for 3 hours, and then heat-treated at 500° C. for 3 hours to prepare a catalyst for preparing multi-walled carbon nanotubes.

Next, 0.2 g of the catalyst for preparing multi-walled carbon nanotubes was placed in a fluidized bed synthesis apparatus, and 225 sccm of $C_2H_4$ (g) and 75 sccm of $H_2$ (g) were added and reacted at 700° C. for 20 minutes to prepare the multi-walled carbon nanotubes, respectively.

Property Evaluation

Figure 2:
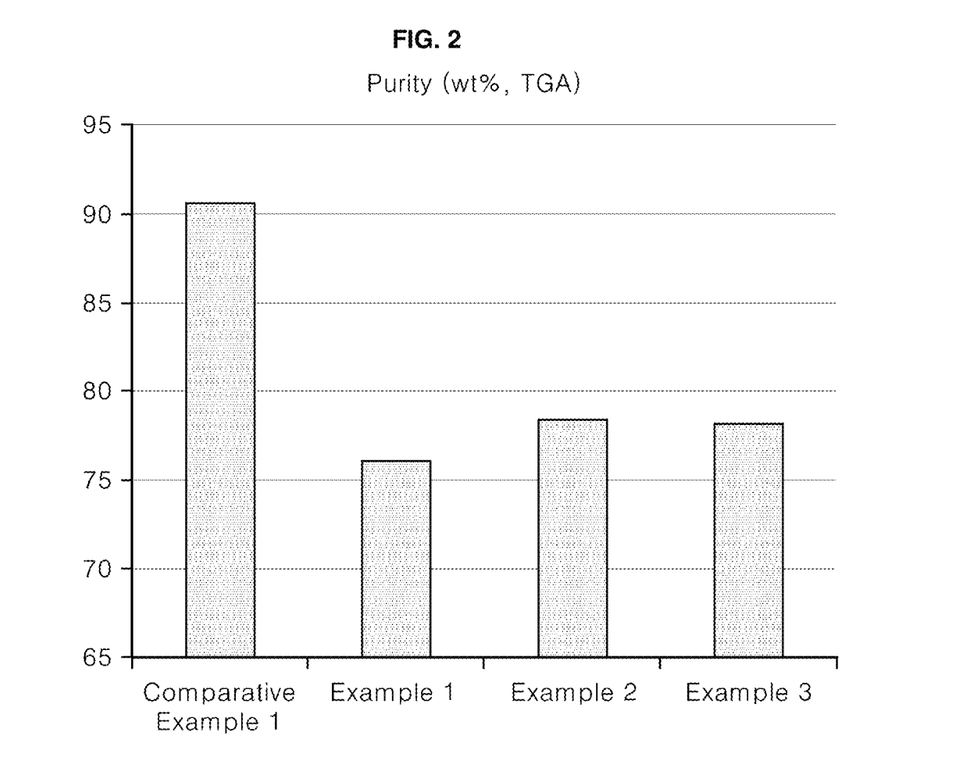
FIG. 2 is a graph showing results of measuring the purity for carbon nanotubes manufactured according to Examples 1 to 3 and Comparative Example 1.
Figure 3:
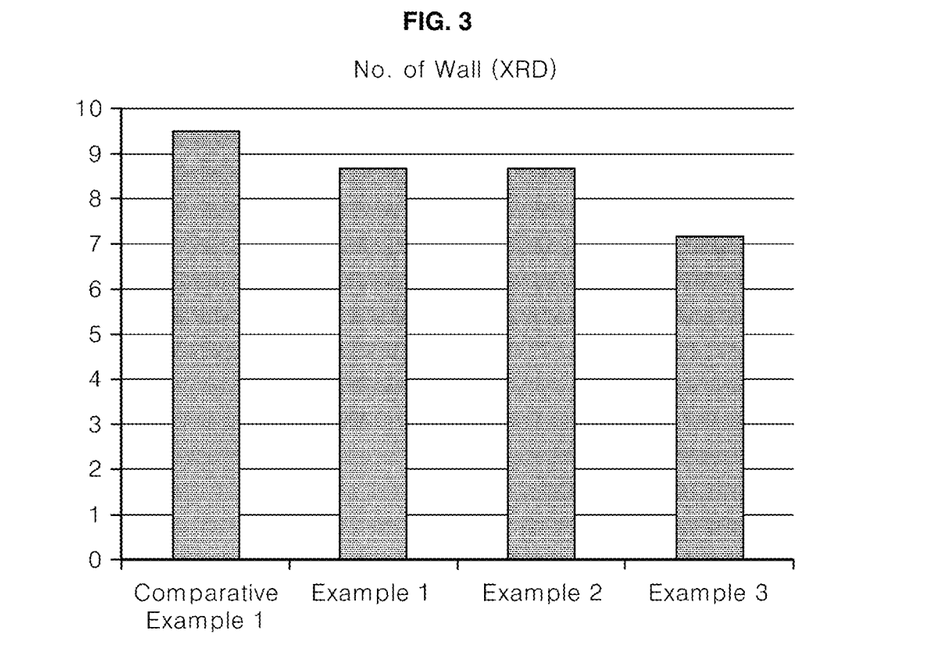
FIG. 3 is a graph showing results of measuring the wall number of carbon nanotubes manufactured according to Examples 1 to 3 and Comparative Example 1.
Figure 4:
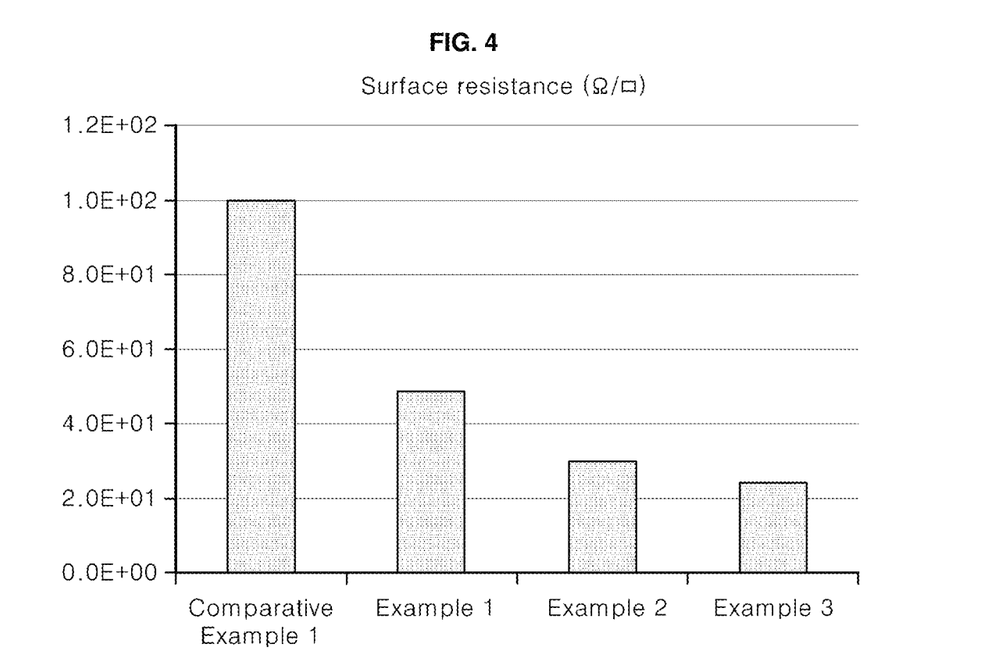
FIG. 4 is a graph showing results of measuring the surface resistance of carbon nanotubes manufactured according to Examples 1 to 3 and Comparative Example 1.
Figure 5:
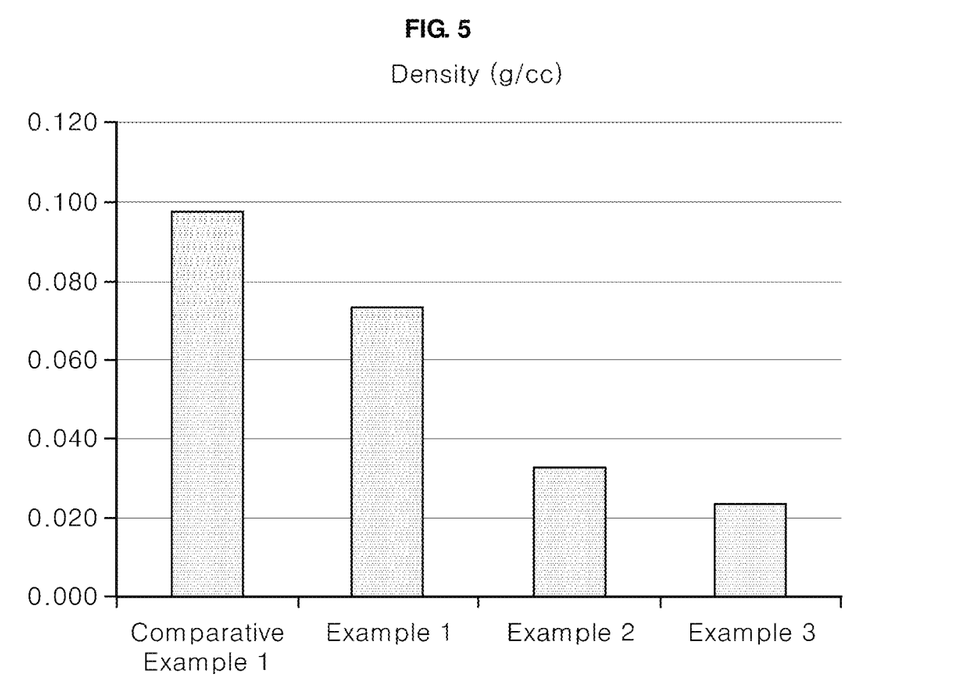
FIG. 5 is a graph showing results of measuring the density of carbon nanotubes manufactured according to Examples 1 to 3 and Comparative Example 1.

Table 2 shows the results of measuring the physical properties of the multi-walled carbon nanotubes manufactured according to Examples 1 to 3 and Comparative Example 1. FIG. 2 is a graph showing the results of measuring the purity of the carbon nanotubes manufactured according to Examples 1 to 3 and Comparative Example 1. FIG. 3 is a graph showing the results of measuring the wall number of carbon nanotubes manufactured according to Examples 1 to 3 and Comparative Example 1. FIG. 4 is a graph showing the results of measuring the surface resistance of carbon nanotubes manufactured according to Examples 1 to 3 and Comparative Example 1. FIG. 5 is a graph showing results of measuring the density of carbon nanotubes manufactured according to Examples 1 to 3 and Comparative Example 1.

1) Measurement of Surface Resistance

Carbon nanotube powder of 1 mg was put into 10 g of an aqueous solution of 2 wt % sodium dodecyl sulfate and dispersed for 5 minutes using an ultrasonic disperser (Tip Sonicator). Then, the dispersion was filtered through a filter using a filter paper (Pore size 0.2 μm, diameter 25 mm) to prepare a bucky paper. Next, the prepared Bucky Paper was dried at room temperature for 24 hours, and then 5 points (upper, lower, left, right, center) were measured according to the position of the Bucky Paper by using a 4-point Portable 4-point probe test meter (Jandel, HM21 model) to express as an average value.

2) Measurement of Wall Number of Carbon Nanotube

The number of walls of multi-walled carbon nanotubes was calculated using XRD with reference to the literature (Materials Chemistry and Physics 114 (2009), 702-708). The analysis conditions and measurement results are shown in the following Tables 2 and 3:

TABLE 2

| XRD(X-ray Diffraction) | |
|---|---|
| Maker | PANalytical |
| Anode material | Cu |
| K-Alpha1 wavelength | 1.540598 Å |
| Generator voltage | 40 kV |
| Tube current | 30 mA |
| Scan Range | 15~35° |
| Scan Step Size | 0.026° |

TABLE 3

| division | d-spacing (Å) | FWHM | Crystallite size (Å) | # of wall |
|---|---|---|---|---|
| Example 1 | 3.46 | 2.8 | 30 | 8.7 |
| Example 2 | 3.45 | 2.8 | 30 | 8.7 |
| Example 3 | 3.46 | 3.3 | 25 | 7.2 |
| Comparative Example 1 | 3.46 | 2.6 | 33 | 9.5 |

As shown in Tables 2 and 3, the full width at half maximum (FWHM) of the peak corresponding to the (001) plane of the multi-walled carbon nanotube was calculated, and d-spacing was obtained by using Scherrer Equation. Then, the crystallite size was calculated by using the Debye-Scherrer equation, and then the number of walls of the multi-walled carbon nanotube was calculated by dividing the crystal size by d-spacing.

3) Density Measurement

Multi-walled carbon nanotubes of 0.1 to 0.5 g are placed in a 10 ml cylinder and tapping is performed for 10 minutes. Then, the volume of the compacted multi-walled carbon nanotubes is measured, and the density is calculated by dividing the weight by the volume.

TABLE 4

| division | Purity (wt %) | Wall number (# of Wall) | Surface resistance ($\Omega/\square$) | density (g/cc) |
|---|---|---|---|---|
| Example 1 | 76.1 | 8.7 | $4.9 \times 10^1$ | 0.073 |
| Example 2 | 78.4 | 8.7 | $3.0 \times 10^1$ | 0.033 |
| Example 3 | 78.2 | 7.2 | $2.4 \times 10^1$ | 0.023 |
| Comparative Example 1 | 90.6 | 9.5 | $1.0 \times 10^2$ | 0.098 |

As shown in Tables 1 to 4 and FIGS. 2 to 5, the purities of the carbon nanotubes manufactured according to Examples 1 to 3 are lower than that of Comparative Example 1 using the pure alumina carrier and the productivity was slightly lowered, because the added amount of $SiO_2$ is increased in the $SiO_2$-$Al_2O_3$ mixed carrier, however it was confirmed that the wall number, the surface resistance and the density were significantly reduced.

In particular, in the carbon nanotubes manufactured according to Examples 1 to 3, it can be seen that the wall number, the surface resistance and the density are linearly decreased as the amount of $SiO_2$ added increases in the $SiO_2$-$Al_2O_3$ mixed carrier.

Based on the above experimental results, the carbon nanotubes manufactured according to Examples 1 to 3 have a smaller number of walls, a lower density and a lower surface resistance than the carbon nanotubes manufactured according to Comparative Example 1 and it can be utilized as an additive for an electroconductive polymer such as an antistatic agent, etc. because of high improvement effect for the electric conductivity.

Microstructure Observation

FIGS. 6 to 9 are SEM photographs showing the final microstructure of the carbon nanotube manufactured according to Comparative Example 1, Example 1, Example 2 and Example 3, respectively.

Figure 6:
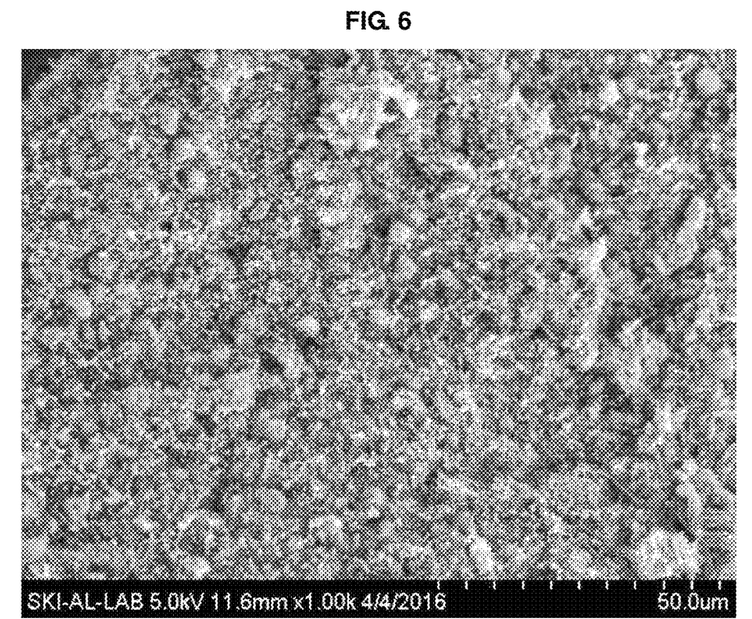
FIG. 6 is a SEM photograph showing a final microstructure of carbon nanotubes manufactured according to Comparative Example 1.

As shown in FIG. 6, it can be confirmed that the carbon nanotubes manufactured according to Comparative Example 1 exhibit microstructure of an entangled structure.

Figure 7:
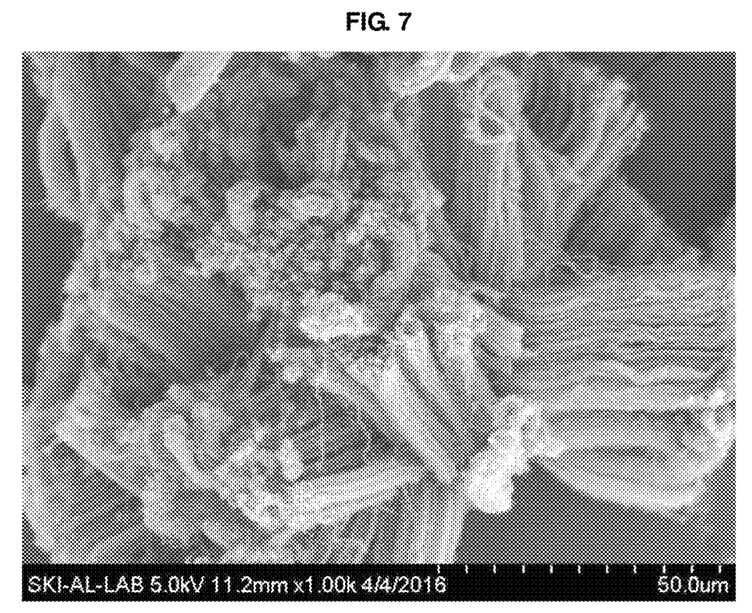
FIG. 7 is a SEM photograph showing a final microstructure of carbon nanotubes manufactured according to Example 1.
Figure 8:
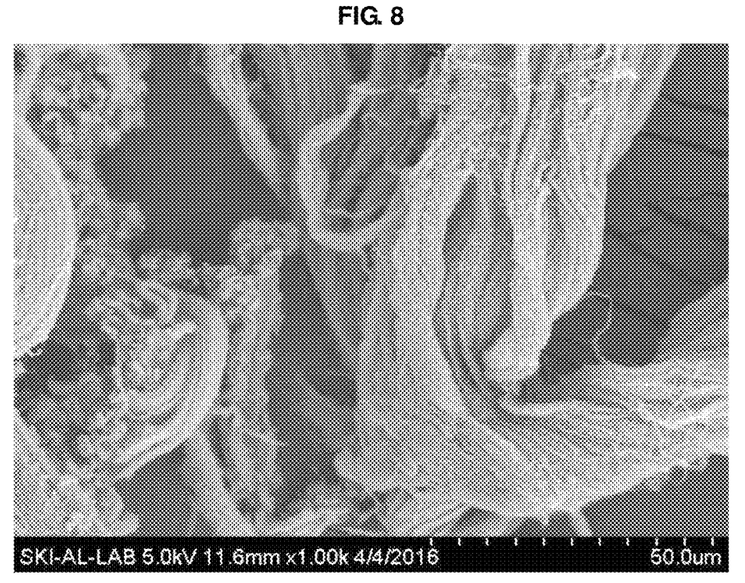
FIG. 8 is a SEM photograph showing a final microstructure of carbon nanotubes manufactured according to Example 2.
Figure 9:
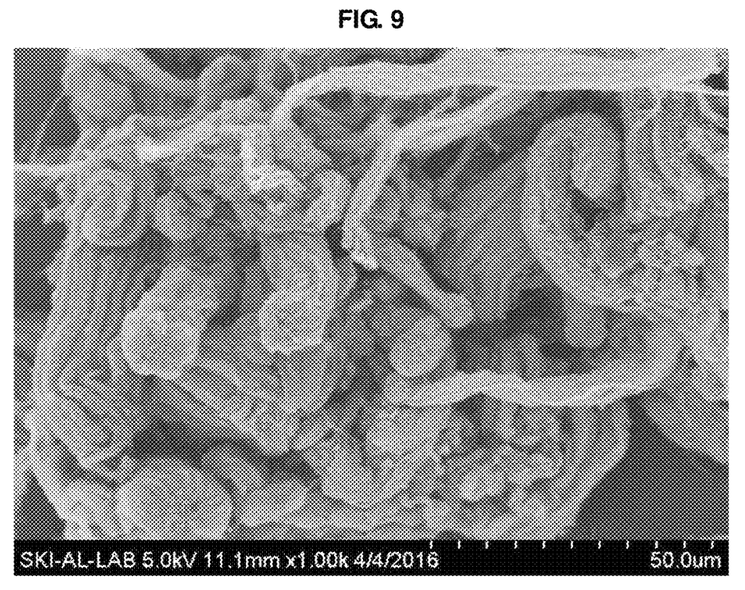
FIG. 9 is a SEM photograph showing a final microstructure of carbon nanotubes manufactured according to Example 3.

While, as shown in FIGS. 7 to 9, it can be seen that the carbon nanotubes manufactured according to Examples 1 to 3 exhibit microstructure having an aligned bundle structure.

It is understood that the carbon nanotubes manufactured according to Examples 1 to 3 have a low number of walls and a low density and surface resistance due to the aligned bundle structure.

The catalyst for manufacturing multi-walled carbon nanotubes according to the present invention and the method of manufacturing multi-walled carbon nanotubes using the same, which are characterized in that a transition metal main catalyst is supported on a silica-alumina ($SiO_2$—$Al_2O_3$) mixed carrier, have smaller number of walls and lower density and surface resistance than carbon nanotubes using a pure alumina carrier.

As a result, the catalyst for manufacturing a multi-walled carbon nanotube according to the present invention and the method of manufacturing a multi-walled carbon nanotube using the same can be utilized as an additive for an electroconductive polymer such as an antistatic agent, etc. because of high electric conductivity improving effect due to low surface resistance thereof.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of manufacturing multi-walled carbon nanotubes comprising the steps of:
   (a) providing a catalyst for manufacturing multi-walled carbon nanotubes comprising a silica-alumina mixed carrier and a transition metal main catalyst supported on the mixed carrier; and
   (b) forming multi-walled carbon nanotubes by reacting the catalyst for manufacturing multi-walled carbon nanotubes with hydrocarbon gas and hydrogen gas at 600 to 900° C.,
   wherein step (a) comprises:
   (a-1) forming the silica-alumina mixed carrier by dissolving and mixing an Si derivative and an Al derivative in a solvent for 10 to 30 minutes, drying a mixture at 100 to 150° C. for 1 to 3 hours and then heat-treating at 450 to 550° C. for 1 to 5 hours; and
   (a-2) forming the catalyst for manufacturing multi-walled carbon nanotubes by dissolving a transition metal main catalyst derivative in a solvent, mixing with the silica-alumina mixed carrier for 10 to 30 minutes, drying at 100 to 150° C. for 1 to 3 hours and then heat-treating at 450 to 550° C. for 1 to 5 hours.

2. The method of manufacturing multi-walled carbon nanotubes according to claim 1, wherein in step (b), the hydrocarbon gas and the hydrogen gas are supplied at a flow rate of 50 to 500 sccm for 5 to 60 minutes, respectively.

3. The method of manufacturing multi-walled carbon nanotubes according to claim 1, wherein in step (b), the multi-walled carbon nanotubes has a wall number of 5 to 10.

4. The method of manufacturing multi-walled carbon nanotubes according to claim 3, wherein the multi-walled carbon nanotubes has a surface resistance of $2.0 \times 10^1$ to $6.0 \times 10^1$ $\Omega/\square$.

5. The method of manufacturing multi-walled carbon nanotubes according to claim 3, wherein the multi-walled carbon nanotubes have an aligned bundle structure.

6. The method of manufacturing multi-walled carbon nanotubes according to claim 3, wherein the multi-walled carbon nanotubes have a density of 0.08 g/cc or less.

7. The method of manufacturing multi-walled carbon nanotubes according to claim 3, wherein the multi-walled carbon nanotubes have an inversely proportional relationship in that the number of walls of the multi-walled carbon nanotubes, the density of the multi-walled carbon nanotubes, and the surface resistance of the multi-walled carbon nanotubes are decreased according to an increase in silica content of the silica-alumina mixed carrier.

\* \* \* \* \*